May 25, 1948. J. E. KLINE ET AL 2,442,009
PEENING DEVICE
Filed Jan. 23, 1942 3 Sheets-Sheet 2
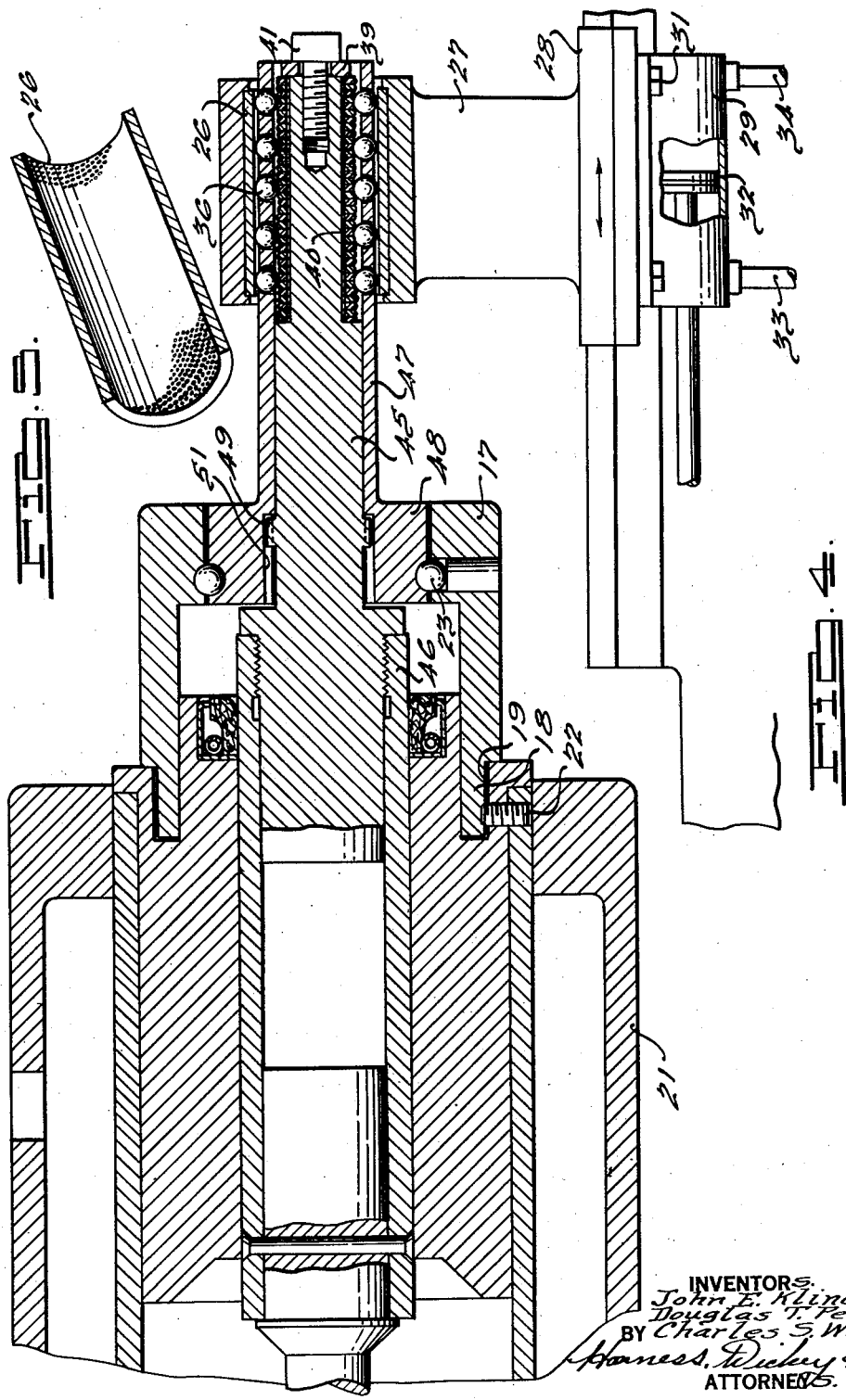
INVENTORS.
John E. Kline,
Douglas T. Peden,
BY Charles S. White.
Barnes, Dickey & Pierce
ATTORNEYS.

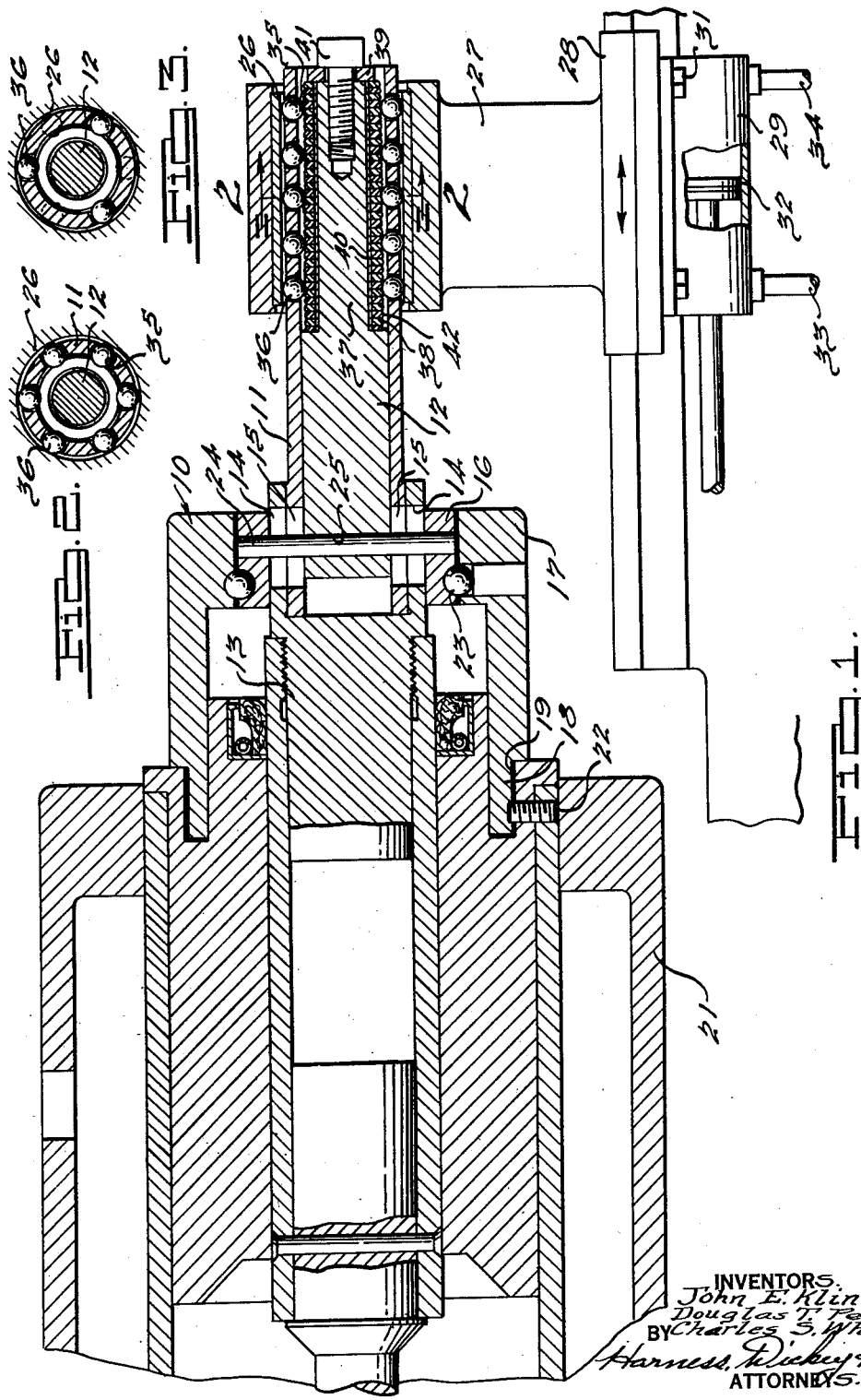

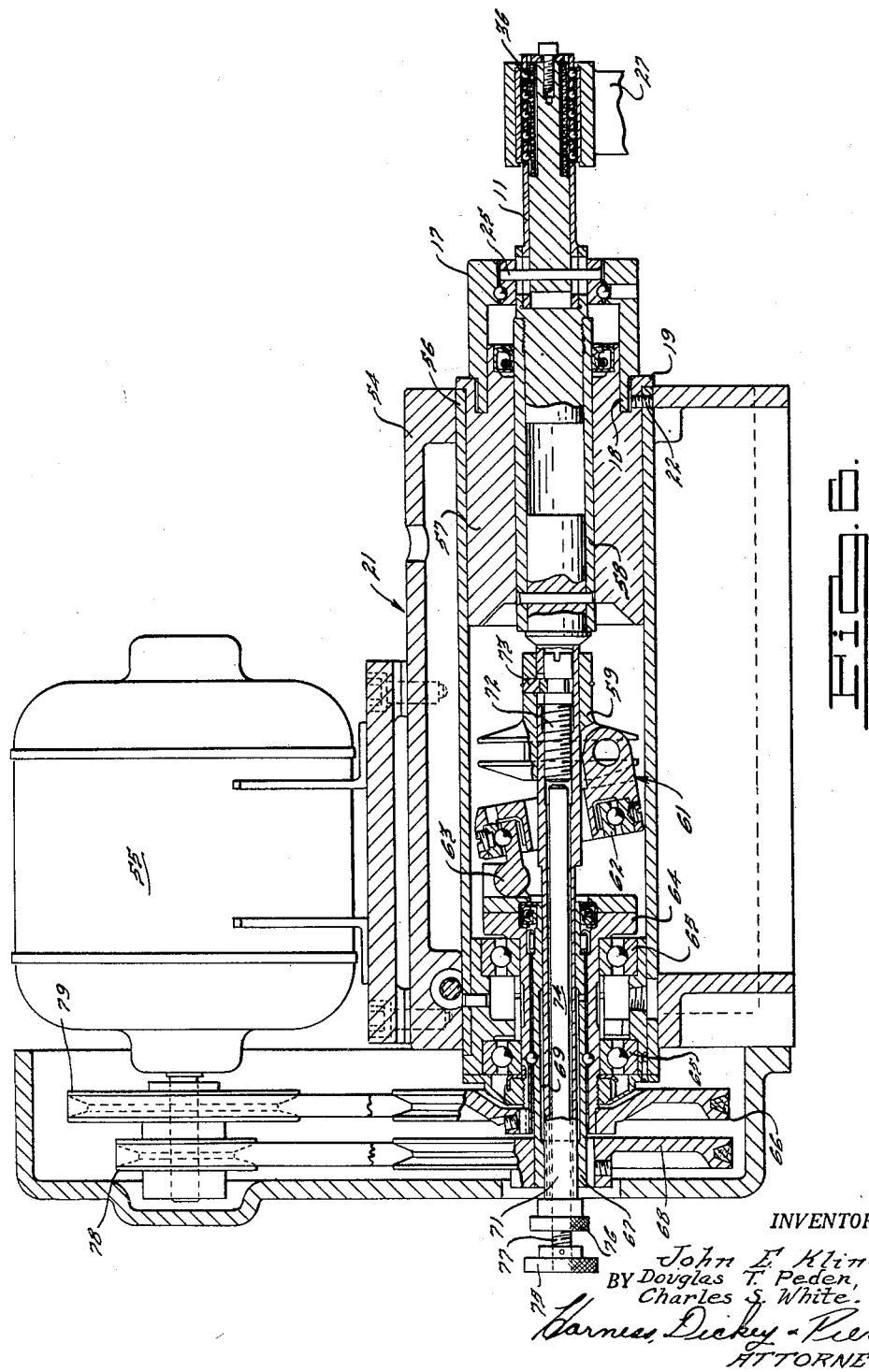

Patented May 25, 1948

2,442,009

UNITED STATES PATENT OFFICE 2,442,009

PEENING DEVICE

John E. Kline, Grosse Pointe Farms, Douglas T. Peden, Ann Arbor, and Charles S. White, Dearborn, Mich., assignors to Micromatic Hone Corporation, Detroit, Mich., a corporation of Michigan Application January 23, 1942, Serial No. 427,938

6 Claims. (Cl. 78—13.1)

This invention relates to metal working devices, and particularly to a peening device for producing minutely spaced interstices in a bearing surface.

Various theories have been presented in the past years about wearing surfaces such as the bearing surface between a shaft and its supporting journal, between cylinders and pistons of engines, and like relatively movable surfaces. Some schools of thought favor the use of highly polished surfaces which eliminates substantially all of the scratch marks produced by grinding, honing, and like finishing operations. Other schools of thought believe that the surfaces, upon being finished to desired dimension, should be ground to produce scratch marks which provide paths for a lubricant which maintains a film between the operating surfaces.

The concept of this invention embodies the application to the finished surface of a magnitude of spaced interstices of minute character and depth, preferably in the moving elements of the set, that is to say, of the shaft and bearing. The interstices passing from the loaded to the unloaded side of the bearing or shaft pick up the oil or lubricant from the unloaded side and carry it across the loaded side. The lubricant is trapped in the interstices and even though the bearing is overload, the lubricant will be carried over the loaded side of the bearing. The grinding of the surface after the piece is finished not only destroys the finish and dimension of the element, but produces inter-related scratch marks which permit the lubricant when moved toward the loaded side of the bearing set to be forced along the scratch marks and away from the loaded area.

The extremely smooth surfaces function properly so long as the shaft and bearing are not overloaded, but should this latter occur, the oil film will be broken and a metal to metal contact will result, which destroys the bearing surfaces. By using the spaced interstices as contemplated by applicant, even if the film should be broken, the lubricant collected in the interstices is available to maintain lubrication between the overloaded surfaces.

The present invention pertains to a device for producing the minutely spaced interstices on the surface of a bearing part. The device embodies a sleeve having apertures therein through which balls may partially extend. The sleeve is placed over an arbor on which a plurality of hardened washers having arcuate peripheries are secured. The arcuate peripheries of the washers form indentations and projecting portions which retract and extend the balls as the arbor is moved axially within the sleeve. The device herein illustrated is constructed to form an attachment upon a machine illustrated and described in the co-pending application of D. T. Peden, Serial No. 365,526, filed November 13, 1940, which issued into Patent No. 2,350,527 on June 6, 1944, and assigned to the assignee of the present invention. This particular machine produces the rotation of the sleeve and arbor and the reciprocation of the arbor relative to the sleeve or the sleeve relative to the arbor, as the case may be. The machine also is provided with a movable table which may be fed relative to the device or which may reciprocate, depending upon the operation required for the results desired.

The balls are extended and retracted during the time the bearing is advanced over the device so as to produce the minute indentations or interstices which are spaced from each other. The inner surface of the bearing is illustrated as being operated on by the device and it is to be understood that this particular showing is made more for the purpose of illustration and that the same principal applies to the exterior surfaces of shafts or other elements when the interstices are to be placed on the outer surface thereof. While the interstices may be disposed in either or both of the surfaces, preferably the moving surface only is provided with the interstices which function as receptacles for raising the lubricant from the unloaded to the loaded side of the shaft or bearing.

Accordingly, the main objects of our invention are: to provide a device for producing a plurality of minute interstices in the surface of a bearing; to provide a device for producing a plurality of interstices on the surface of a bearing through the projection and retraction of a plurality of balls which progressively advance over the surface of the element during the operation; to synchronize the rotation of the device for producing minute interstices in the surface of a bearing as the bearing is advanced over the device to have the interstices disconnected from each other; and in general, to provide a device for producing a bearing surface having a plurality of interstices, for impelling a lubricant, which is simple in construction, positive in operation, and economical of manufacture.

Other objects and features of novelty of this invention will be either specifically pointed out or will become apparent when referring, for a better understanding of the invention, to the following description taken in conjunction with the accompanying drawings, wherein:

Figure 1 is a sectional view, with parts broken away, of a device for producing interstices in the surface of a bearing which embodies features of this invention;

Fig. 2 is a sectional view of the structure illustrated in Fig. 1, taken on the line 2—2 thereof;

Fig. 3 is a view of structure similar to that in Fig. 2 showing a modified form thereof;

Fig. 4 is a view of structure similar to that illustrated in Fig. 1, showing another form of the device;

Fig. 5 is a sectional view of a bearing after being operated upon by the device illustrated in Fig. 4;

Fig. 6 is a sectional view of a machine for producing the reciprocation and rotation of the peening device illustrated in Fig. 1.

Referring to Figs. 1 and 2, we have illustrated a peening device 10 embodying a sleeve 11 which projects over an arbor 12. The sleeve is secured to a threaded shank 13 having diametrically disposed slots 14 in the wall thereof which communicate with the slot 15 in the wall of the sleeve. A bearing race 16 extends over the threaded element 13 and projects within an outer sleeve 17 having an extending flange 18. The flange 18 projects within an annular slot 19 of a machine 21, illustrated in the issued patent referred to above, where it is secured by a set screw 22.

A plurality of balls 23 are disposed in the raceways of the race 16 and sleeve 17 which permit the race 16 to rotate while prevented from being reciprocated. A pin 24 extends through the race 16 through slots 14 and 15 in the element 13 and sleeve 11 and through the aperture in the arbor 12. This produces a driving connection in rotation to the arbor 12 but prevents the arbor from being reciprocated when the element 13 is reciprocated. Means are provided in the machine for rotating and reciprocating the element 13 which is adjustable so that the element may be rotated only or reciprocated only, or any variation between the speed in rotation and reciprocation may be obtained. The length of stroke in reciprocation of the element 13 may also be adjusted. It is to be understood that the machine herein referred to is a separate invention, illustrated for convenience, and that any other machine which will produce the related movement between the device 10 and the workpiece may be employed.

A bearing shell 26 is clamped in a standard 27 which is carried by a table 28. The underside of the table has a cylinder 29 secured thereto by bolts 31 for operating over a piston 32 under the influence of a fluid introduced through the conduits 33 and 34. The table may be advanced slowly over the tool 10 or it may reciprocate over the tool during the time the sleeve 11 is rotated and reciprocated. The sleeve 11 is provided with truncated spherical apertures 35 in which balls 36 are disposed and which are of such size as to project from the apertures 35 while being retained within the apertures by the reduced outer edge portions.

The arbor 12 has an end portion 37 of reduced diameter over which a plurality of washers 38 are disposed and secured in juxtaposition by a washer 39 retained on the end of the arbor 12 by the bolt 41. The reduced end portion may be opened as indicated to permit the washers 38 to have lateral movement. The washers are arcuate in shape at the peripheral edge 42 to provide circumferential recesses at the point where two of the washers abut, and circumferential projections medially of the outer faces of the washers.

As the sleeve 11 is reciprocated over the arbor 12 the balls 36 will move from the depressed areas and will project outwardly from the sleeve 11 as the balls are engaged by the medially projected portion of the washers. The balls are continuously extended and retracted by the washers to thereby apply material pressure at the point of engagement of the balls with the surface to produce the indentations or interstices desired in the workpiece surface 26. It will be noted that the balls are disposed as closely together as possible both when aligned longitudinally of the sleeve and when radially disposed about the circumference thereof.

In Fig. 3, we have illustrated alternate rows of the balls as being offset from each other so as to offset the interstices relative to each other in the wall of the bearing. In the device illustrated in Fig. 1, various patterns of interstices may be formed in the wall of the sleeve by changing the relative speed of movement of the table 28, and arbor 12, and the sleeve 11. The degree of reciprocation of the arbor 12 may be varied relative to the degree of rotation of the sleeve 11. Similarly the table 28 may be moved at any speed and may be reciprocated back and forth to move the bearing 26 over the tool. After the peening operation the surface of the sleeve is again finished to desired dimension by removing the metal which flowed inwardly resulting from the peening operation. This isolates most of the interstices from each other so as to be effective to trap the lubricant when the bearings are unloaded.

In Fig. 4, we have illustrated a modified form of the device illustrated in Fig. 1, that wherein an arbor 45 is connected to the sleeve 46 of the machine which reciprocates and rotates the arbor. A sleeve 47 encompasses the arbor 45 and is provided with a race portion 48 which cooperates with the sleeve 17 to form a roller bearing when the rollers 23 interconnect the sleeve to the race portion. The arbor 45 has splines 49 which operate in splineways 51 in the inner surface of the sleeve. Otherwise the structure is the same as that illustrated and described in Figs. 1, 2, and 3 above.

The rotation and reciprocation of the spindle 46 produces the rotation and reciprocation of the arbor 45 which produces the rotation of the sleeve 47 therewith. The sleeve 47 rotates but does not reciprocate as the peening operation progresses. Similarly, the movement of the table 28 may be adjusted to feed the bearing 26 slowly over the balls 36. Preferably the rotation of the sleeve 47 and the movement of the table 28 are synchronized with each other in timed relation to the reciprocation of the arbor 45 so as to produce closely adjacent interstices which are spaced apart and which are disposed on over-crossing helical paths around the surface of the sleeve. A subsequent operation is thereafter performed on the surface of the workpiece to machine off the high spots about each interstice to return the sleeve to its original diameter and finish its inner surface at all points except where the interstices occur. All of the interstices will be disconnected from each other so that each will form a pocket for trapping the lubricant and carrying the lubricant across the face of the loaded portion of the bearing.

For a more detailed description of the machine for operating the peening device 10, the machine referred to in the above patent is illustrated in detail in Fig. 6. A housing 54 supports a motor 55 and a sleeve 56. The sleeve contains a bushing 57 having an annular slot 19 into which the extending flange 18 of the sleeve 17 projects and is secured in position by the setscrew 22. The sleeve 17 is in this manner fixed to the housing 54 of the machine 21. The bushing carries a rotatable and reciprocable sleeve 58 which is secured to a collar 59 of a swash plate 61. The swash plate has a bearing element 62 containing a projecting ball extension 63 which is secured to a plate 64 supported in bearings 65 and driven by a pulley 66. Within the bearing element 64, a sleeve 67 is driven by a pulley 68.

The sleeve 67 is connected by a spline 69 to a sleeve 71, the forward end of which projects within the collar 59 in a manner to be adjustable relative thereto. The end of the sleeve 11 is internally threaded and contains a threaded stud 72 which is secured by an assembly 73 against longitudinal movement relative to the collar to adjust the collar 59 on the sleeve 71 when the stud is rotated. The stud 72 has a rod 74 which extends from the end of the sleeve 71 and contains an adjustable thumb nut 75 on the outer end. A thumb nut 76 is secured by a thread 77 on the end of the rod 74 adjacent to the thumb nut 75, for locking the rod in adjusted position against the outer end of the sleeve 71.

The motor 55 drives pulleys 78 and 79 which are of different diameters so as to drive the pulleys 66 and 68 at different speeds. When so driven, the portion of the bearing 62 of the swash plate 61 having the ball extension 63, operates at different speeds relative to the collar 59 so that the collar is reciprocated an amount depending upon the angular position of the swash plate. This angular position may be adjusted by the rotation of the stud 72 by the thumb nut 75. The speed of rotation of the sleeve 58 is controlled by the relative size of the pulleys 68 and 78. The number of reciprocations produced to the sleeve 58 relative to the rotation thereof depends upon the relative size of the pulleys 78 and 79. The degree of reciprocation, that is to say, the length of the stroke, is controlled by the amount of tilt to the swash plate 61. By this means the sleeve 58 is rotated and reciprocated.

The end portion 37 of the peening device 10 being fixed against reciprocation by the pin 25, the reciprocation of the sleeve 58 and sleeve 11 thereover produces the contraction and expansion of the hardened balls 36 as the device rotates. During such rotation the table 28 may be reciprocated at a speed controlled by the flow of fluid in the cylinder 29. In this manner, all of the device may be adjusted to operate at various relative speeds in synchronism with each other.

From the foregoing it will be apparent that the multiplicity of pressure impacted radial movements of the balls 36 function to produce a corresponding multiplicity of interstices in the surface of the workpiece. Formal changes may be made in the specific embodiment of the invention described without departing from the spirit of the invention, the scope of which is commensurate with the following claims.

What is claimed is:

1. In a device for forming interstices in a bearing surface including, a body portion having a plurality of apertures, hardened balls in said apertures, an arbor movable within said body portion having a plurality of hardened washers secured thereto, the periphery of said washers being arcuate to produce extending portions which force the balls beyond the outer face of the body when the arbor is moved longitudinally of the body.

2. In a device for forming interstices in the surface of a bearing which includes, a rotatable sleeve having a plurality of apertures therein, hardened balls in said apertures, an arbor within said sleeve having projected and indented portions engageable with said ball, and means for driving said sleeve in rotation and reciprocation while driving said arbor in rotation only.

3. In a device for forming interstices in the surface of a bearing which includes, a rotatable sleeve having a plurality of apertures therein, hardened balls in said apertures, an arbor within said sleeve having projected and indented portions engageable with said ball, means for reciprocating and rotating said arbor, and means for rotating said sleeve.

4. In a device for forming interstices in the surface of a bearing which includes, a rotatable sleeve having a plurality of apertures therein, hardened balls in said apertures, an arbor within said sleeve having projected and indented portions engageable with said ball, means for reciprocating and rotating said arbor, means for rotating said sleeve, and means for moving said bearing over said device with the movements synchronized with the movement in rotation of the sleeve.

5. In a device for forming interstices in the surface of a bearing which includes, a rotatable sleeve having a plurality of apertures therein, hardened balls in said apertures, an arbor within said sleeve having projected and indented portions engageable with said ball, means for driving said sleeve in rotation and reciprocation while driving said arbor in rotation only, and means for reciprocating said bearing over the portion of the device containing said balls.

6. In a device for forming interstices in the surface of a bearing which includes, a body portion, hardened members extending into said body portion at spaced points along its length, means movable relative to the body portion for periodically extending said hardened elements to have portions thereof project beyond the surface of the body portion, means for rotating said device relative to the surface of the bearing to be operated on, and means for feeding the bearing over the length of the device from which the members extend.

JOHN E. KLINE.
DOUGLAS T. PEDEN.
CHARLES S. WHITE.

REFERENCES CITED

The following references are of record in the file of this patent:

UNITED STATES PATENTS

| Number | Name | Date |
|---|---|---|
| 864,370 | Grill | Aug. 27, 1907 |
| 1,841,879 | Croxford | Jan. 19, 1932 |
| 2,069,099 | Satterthwaite | Jan. 26, 1937 |
| 2,149,787 | Olson | Mar. 7, 1939 |
| 2,170,631 | Cogsdill | Aug. 22, 1939 |
| 2,190,386 | Scholtes | Feb. 13, 1940 |
| 2,350,527 | Peden | June 6, 1944 |